United States Patent
Kondo et al.

(10) Patent No.: US 6,855,276 B2
(45) Date of Patent: Feb. 15, 2005

(54) MANUFACTURING METHOD FOR ORIENTED FILM, POLARIZING FILM, POLARIZING PLATE, AND VISUAL DISPLAY

(75) Inventors: Seiji Kondo, Ibaraki (JP); Kazuki Tsuchimoto, Ibaraki (JP); Akihiro Nishida, Ibaraki (JP); Ryouji Kinoshita, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 71 days.

(21) Appl. No.: 10/114,752

(22) Filed: Apr. 2, 2002

(65) Prior Publication Data

US 2002/0182427 A1 Dec. 5, 2002

(30) Foreign Application Priority Data

Apr. 3, 2001 (JP) ........................................ 2001-104054
Aug. 30, 2001 (JP) ........................................ 2001-261479

(51) Int. Cl.[7] ............................... B29D 7/01; D02J 1/22
(52) U.S. Cl. .................................... 264/1.34; 264/288.4
(58) Field of Search ................................. 428/522, 910; 264/1.34, 288.4

(56) References Cited

U.S. PATENT DOCUMENTS

| | | | |
|---|---|---|---|
| 3,985,849 A | | 10/1976 | Notomi et al. ................. 264/95 |
| 4,643,529 A | * | 2/1987 | Hosonuma et al. ......... 350/337 |
| 6,055,096 A | * | 4/2000 | Michihata et al. .......... 359/352 |

FOREIGN PATENT DOCUMENTS

| | | |
|---|---|---|
| JP | 63-261201 | 10/1988 |
| JP | 10039137 | 2/1998 |

* cited by examiner

*Primary Examiner*—Monique R. Jackson
(74) *Attorney, Agent, or Firm*—Westerman, Hattori, Daniels & Adrian, LLP

(57) ABSTRACT

An oriented film of polyvinyl alcohol derived film with reduced stretch irregularity and uniform orientation in a wide range of a stretching ratio is obtained by a manufacturing method for an oriented film, comprising the steps of: contacting a non-stretched film, comprising polyvinyl alcohols or derivatives thereof, with moisture percentage adjusted to no more than 10%, to at least one heating roll currently driven and heating the film at no less than 70° C.; subsequently giving a tension and stretching using a peripheral velocity difference between the heating roll concerned and a stretch roll in a position ahead of said heating roll in a running direction of the film.

19 Claims, 1 Drawing Sheet

Running direction of the film

Running direction of the film

MANUFACTURING METHOD FOR ORIENTED FILM, POLARIZING FILM, POLARIZING PLATE, AND VISUAL DISPLAY

BACKGROUND OF THE INVENTION

1. Technical Field of the Invention

The present invention relates to a manufacturing method for an oriented film of polyvinyl alcohol derived films used for a polarizing film etc. Furthermore, the present invention relates to a polarizing film comprising an oriented film obtainable by the manufacturing method for the oriented film concerned. A polarizing film is used as a polarizing plate etc. for a visual display, such as a liquid crystal display, an organic EL display, a PDP (plasma display panel).

2. Description of the Prior Art

Conventionally, an oriented film of polyvinyl alcohol derived films has been used as a polarizing film for a liquid crystal display etc. As a manufacturing method for the oriented film concerned, a wet type stretching method and a dry type stretching method may be mentioned. Since moisture percentage of a film gives some effects to stretching, in the wet type stretching method, a stretch irregularity is easy to be obtained in an oriented film. On the other hand in the dry type stretching method, since stretching is conducted in away that tensile stress is given, using a ratio of peripheral velocity between stretching rolls, to a film heated to be stretched at no less than a glass transition temperature, some un-uniformity based on a deformation by the tensile stress may be arisen when the film is stretched thinner, and, as a result, a stretch irregularity may easily obtained. In a polarizing film using the oriented film that has the above described stretch irregularity, problems of color irregularity and performance irregularity may possibly occur.

Japanese Patent Publication No. 2731813 etc. is propomed to a problem of a manufacturing method for an oriented film by the above described dry type stretching method. In a method given in the official report concerned, as shown in FIG. 2, before a film 1 contacts a heating roll 2, a stretch is performed in a way that a film 1 is contacted to a heating roll 2, while a tension is given to a film 1 from a direction backside, using a peripheral velocity difference between the heating roll 2 (high-speed roll) and a low-speed roll 4 configured behind of the heating roll 2 in a running direction of the film 1. According to this method, since a stretch starting position y is located on one line in the width direction, a stretch is completed in an instant and, as a result, a uniform stretch is possibly obtained.

However, in the above-described method, since a rapid stretch is given in an instant, a tension at the time of a stretching reaches a high value. A stretch needs to be performed by fully sticking a film 1 to a heating roll 2, in order to solve the problem, and then an adjustable range of stretching conditions is limited. That is, in the above described method, if the tension at the time of a stretch is set low, a floating-up of the film 1 is arisen on the heating roll 2, and conversely if it is set too high, a breakage at the time of stretching will be given. For this reason, an adjustable region for a stretching ratio is forced to be narrow.

SUMMARY OF THE INVENTION

An object of the present invention is to provide a method for manufacturing a polyvinyl alcohol derived film with reduced stretch irregularity and uniform orientation in a wide range of a stretching ratio. Furthermore, an object of the present invention is to provide a polarizing film, a polarizing plate, and a visual display using the oriented film obtainable by the manufacturing method for the film concerned.

As a result of repeated examinations carried out wholeheartedly by the present inventors to solve the abovementioned problems, a manufacturing method of a polarizing film shown below was found out and the present invention was completed.

The present invention relates to a manufacturing method for an oriented film comprising the steps of: contacting a non-stretched film, comprising polyvinyl alcohols or derivatives thereof, with moisture percentage adjusted to no more than 10%, to at least one heating roll currently driven and heating the film at no less than 70° C.; subsequently giving a tension and stretching using a peripheral velocity difference between the heating roll concerned and a stretch roll in a position ahead of said heating roll in a running direction of the film.

In a manufacturing method for an oriented film of the present invention, a range of a moisture percentage and a stretching condition of the film may be set wider, since a tension is given to an un-oriented film from a direction a head of a running direction and a stretching is performed immediately after the film is contacted to a heating roll, and heated at no less than predetermined temperature. Therefore, since a stretch irregularity is reduced and a uniform orientation is obtained, a region is expanded where more stable stretch is enabled. And, since a stretching is performed by a tension from a direction ahead of the heating roll, a restriction of the stretching condition which is induced by a poor adhesion of the film to the heating roll by a tension from a direction back of the heating roll as in the past may also be loosened.

In the above described stretching process in the manufacturing method for the above described oriented film, a rate of strain is preferable to be no less than 1.4 (1/s).

Although a stretching rate in the stretching process is not especially limited, an oriented film with a large birefringence and a good degree of orientation is realized preferably to obtain a polarizing film with good contrast when the rate of strain is set no less than 1.4 (1/s). The rate of strain is preferably set no less than 2.5 (1/s), more preferably no less than 5 (1/s). In addition, although a maximum of the rate of strain is not especially limited, it is preferable to be adjusted to no more than 8 (1/s) in consideration of breakage at the time of stretching of the film.

In the manufacturing method of the above-described oriented film, a non-stretched film may be dyed beforehand with iodine or a dichroism dyestuff. Moreover, in the manufacturing method of the above-described oriented film, a stretched film may be dyed with iodine or a dichroism dyestuff after stretching the non-stretched film.

And particularly the present invention relates to a polarizing film comprising an oriented film obtainable by the manufacturing method for the above described oriented film. And more particularly the present invention relates to a polarizing plate with which an optical transparent protective layer is prepared at least in one side of the above described polarizing film. Furthermore, the present invention relates to a visual display using the above-described polarizing plate.

DESCRIPTION OF THE PREFERRED EMBODIMENTS

Polyvinyl alcohols or derivatives thereof are used for a material of a non-stretched film used in a manufacturing method for an oriented film of the present invention. As derivatives of polyvinyl alcohol, in addition to polyvinyl formals, polyvinyl acetals, etc. may be mentioned, and derivatives modified with olefins, such as ethylene and propylene; unsaturated carboxylic acids, such as acrylic acid, methacrylic acid, and crotonic acid; alkyl esters of the above described unsaturated carboxylic acids and acrylamide etc. may be mentioned. Generally, polyvinyl alcohol with approximately 1000 to 10000 of degree of polymerization and approximately 80 to 100 mol % of degree of saponification is used. Although a thickness of a non-stretched polyvinyl alcohol derived film is not especially limited, it is usually approximately 30 to 150 μm.

In addition, additives, such as plasticizers, may also be contained in the above described polyvinyl alcohol derived non-stretched film. As plasticizers, polyols and condensates thereof, etc., for example, glycerin, diglycerin, triglycerin, ethylene glycol, propylene glycol, polyethylene glycols, etc. may be mentioned. Although an amount of the plasticizers used is not especially limited, it is preferable to be set no more than 20% by weight in the non-stretched film.

The above described non-stretched film of polyvinyl alcohol derived films is appropriately adjusted in moisture percentage so that it may be suitable for a dry type stretching method. The moisture percentage of the non-stretched film of the present invention is no more than 10%. In addition, a moisture percentage represents a percentage of moisture weight to a weight of the non-stretched film in an absolute dry condition. Although a method of adjusting the moisture percentage of the non-stretched film is not especially limited, for example, a drying method for film lines with an electric heater, a drying oven, a heating roll, a drum, and a belt, etc. may be employable. A drying temperature is preferably no less than 50° C. in consideration of productivity. The above described moisture percentage is preferably no more than 8%, and more preferably no more than 5%. In addition, the moisture percentage is preferably no less than 0.5% in consideration of avoiding stretch irregularity.

Figure 1:
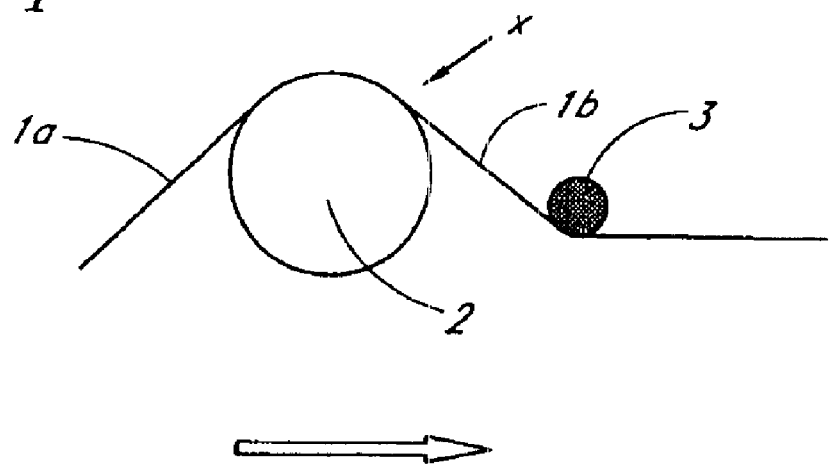
FIG. 1 is a conceptual Figure of one embodiment of a manufacturing method of an oriented film of the present invention.

Manufacturing methods for an oriented film of the present invention will be illustrated, referring to FIG. 1. In FIG. 1a conceptual figure is shown where stretching is performed by a stretch roll 3 currently driven configured so as to be in the direction ahead of a heating roll 2 in the running direction of a film 1, after a polyvinyl alcohol derived film 1 is contacted to a heating roll 2 currently driven, in the state where tension is given.

Un-oriented film 1a called a material roll is heated by the heating roll 2. Although the surface material of the heating roll 2 is not especially limited if it is a material that does not generate slipping with polyvinyl alcohol derived films, metals and ceramics are suitable. And a surface roughness of the heating roll 2 is more preferable as is close to a mirror finish.

A surface temperature of the heating roll 2 is no less than 70° C., and thereby the un-oriented film 1a is heated by no less than 70° C. A surface temperature of the heating roll 2 is preferably approximately 80 to 120° C., and more preferably 90 to 110° C. When the surface temperature of the heating roll 2 is less than 70° C., manufacturing of a continuous stretched film is difficult, since a tensile yield point stress at a contact part between the heating roll 2 and the film 1 approaches a breaking stress value. On the other hand, if the surface temperature of the heating roll 2 becomes higher, there is a possibility that plasticizers contained in the film 1 may be strongly evaporated, and a floating-up may be generated between the heating roll 2 and the film 1 to obtain an undesirable poor uniformity. In addition, although a case is illustrated in FIG. 1 where one heating roll is prepared, two or more heating rolls may also be configured. And, a guide roll may also be configured front side of the heating roll 2.

The film 1a being contacted the heating roll 2 and heated at more than predetermined temperature is then given a tension from the direction ahead and stretched by the stretch roll 3. Stretching is performed using a peripheral velocity difference between the low-speed heating roll 2 and the high-speed stretching roll 3. A peripheral velocity difference is suitably set based on the tension to be given to the film 1a. The tensile yield point stress of the un-oriented film 1a is rapidly decreased at a contact part with the heating roll 2, and then the film is stretched longitudinal and uniaxially and made thinner at a stretch starting position x by a tension of the stretch roll 3 from the direction ahead and becomes an oriented film 1b.

The stretch roll 3 may be in un-heated state or in heated state at less than 70° C. Since a stretching region is spread in a large area when the stretch roll 3 is heated by no less than 70° C., a stable and uniform stretch is not realized. Material of the stretch roll 3 is not especially limited, and the same material as the heating roll 2 may be used. Although a location in which the above described stretch roll 3 is installed will not be especially limited if it is installed ahead of the heating roll 2 in the running direction of the film 1, necking of the film 1 is decreased and generating of a stretch irregularity can be inhibited by shortening a roll gap between the stretch roll 3 and the heating roll 2. When two or more heating rolls 2 are used, the film 1 may also be stretched in multi-stage stretching method by two or more stretch rolls 3 installed together with two or more of the heating rolls 2, and on the other hand the stretch roll 3 may also be installed only for the last heating roll of two or more heating rolls 2.

A stretching ratio of the oriented film is suitably set according to the object, and is 2 to 6 times, preferably 3 to 5.5 times, and more preferably 3.5 to 5 times. And the tension from the direction ahead etc. may be suitably set according to a stretching ratio. A thickness of the stretched oriented film is preferably approximately 5 to 40 μm.

In the above described stretching process, it is suitable as described above that a rate of strain is adjusted no less than 1.4 (1/s). The rate of strain may be suitably adjusted by controlling appropriately a heating period of time, a heating temperature, a line velocity, a distance between rolls in a stretching part, etc. In addition, measurement of a rate of strain is performed by the following methods: for example, a gauge mark is beforehand given to a non-stretched film with ink etc., and a distortion ((elongation of distance between gauge marks)/(distance between gauge marks)) is obtained from a distance between the gauge mark, and the elongation of the distance between the gauge marks in a stretching process, and subsequently, the distortion is divided by a period (s) of time required of elongation. A photograph may be taken with a high-speed camera, an image analysis is performed, and the elongation of the distance between gauge marks may be obtained.

In the manufacturing method of the above-described oriented film, a non-stretched film 1a may be dyed beforehand with iodine or a dichroism dyestuff. Moreover, the stretched film 1b may be dyed with iodine or a dichroism dyestuff after a non-stretched film is stretched. Although dyeing method is not especially limited, an iodine-potassium iodide aqueous solution is used in general when iodine is used, and a dyestuff aqueous solution is commonly used when a dichroism dyestuff is used. The oriented film to which dyeing processing is given with iodine or a dichroism dyestuff is used as a polarizing film. And, the stretched polyvinyl alcohol derived film may be given a durability-enhancing processing by boric acid etc. The oriented film (polarizing film) to which dyeing, boric acid processing, etc. were given is dried according to a usual method.

The above-described polarizing film (polarizer) may be used as a polarizing plate with an optical transparent protective layer prepared at least on one side thereof using a usual method. The optical transparent protective layer may be prepared as an application layer by polymers, or a laminated layer of films. Proper transparent materials maybe used as a transparent polymer or a film material that forms the transparent protective layer, and the material having outstanding transparency, mechanical strength, heat stability and outstanding moisture interception property, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

A hard coat layer may be prepared, or antireflection processing, processing aiming at sticking prevention, diffusion or anti glare may be performed onto the face on which the polarizing film of the above described transparent protective film has not been adhered (the face without the above described application layer thereon).

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 $\mu$m, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned. The above-described adhesives are usually used as adhesives comprising aqueous solution, and usually contain solid of 0.5 to 60% by weight.

A polarizing plate of the present invention is manufactured by adhering the above described transparent protective film and the polarizing film using the above described adhesives. The application of adhesives may be performed to any of the transparent protective film or the polarizing film, and may be performed to both of them. After adhered, drying process is given and the adhesion layer comprising applied dry layer is formed. Adhering process of the polarizing film and the transparent protective film may be performed using a roll laminator etc. Although a thickness of the adhesion layer is not especially limited, it is usually approximately 0.1 to 5 $\mu$m.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness maybe controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarization plate may be used as elliptically polarization plate or circularly polarization plate on which the retardation plate is laminated. A description of the above-mentioned elliptically polarization plate or circularly polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly work ability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives maybe preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarization plate top or a optical film top using suitable developing methods, such as flow method and coating method, or a method in which an adhesive layer is once formed on a separator, as mentioned above, and is then transferred on a polarization plate or an optical film may be mentioned.

An adhesive layer may also be prepared on one side or both sides of a polarization plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarization plate or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarization plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

Inorganic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

Hereinafter, constitution and effects of the present invention will be illustrated using examples shown below.

Example 1

A polyvinyl alcohol film (manufactured by KURARAY CO., LTD., 9P75R) with a thickness of 75 $\mu$m and a width of 900 mm was controlled to 3.3% of moisture percentage in an air conditioning oven. After this film was heated by being contacted to a heating roll of 350 mm of outer diameter with a surface temperature of 100° C., it was contacted onto a stretch roll (150 mm of outer diameters) at ordinary temperature which is in a position ahead of the heating roll in the running direction of a film, as shown in FIG. 1. By varying a peripheral velocity of the heating roll (low-speed roll) and the stretch roll (high-speed roll), tension of 1200 to 2300 N from a direction ahead, and subsequent stretching was given to the film, and thus an oriented film was manufactured.

Comparative Example 1

Figure 2:
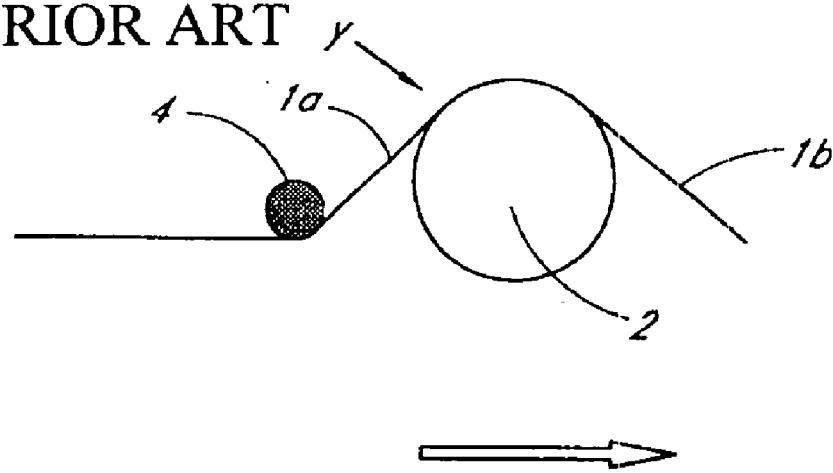
FIG. 2 is a conceptual Figure of one embodiment of a conventional manufacturing method of an oriented film of the present invention.

The same polyvinyl alcohol film as in Example 1 was adjusted to 3.3% of moisture percentage. After this film was contacted onto a roll (150 mm of outer diameter) at ordinary temperature that is in a position backward to the heating roll in the running direction of a film, it was then contacted to a heating roll of 350 mm of outer diameter with a surface temperature of 100° C., as shown in FIG. 2. By varying a peripheral velocity of the roll (low-speed roll) at ordinary temperature and the heating roll (high-speed roll), tension 1200 to 2300 N from a direction backward, and subsequent stretching was given to the film, and thus an oriented film was manufactured.

In addition, in Example 1 and Comparative example 1, a stretch tension represents a value measured by a tension meter currently installed in a stretching machine.

Evaluation

In the manufacture of an oriented film shown by Example and Comparative example, a tension range in which the film may be stably and uniformly stretched, and a stretching ratio at that time were investigated. Results are shown in Table 1. The check of uniformity was performed by the visual confirmation of the phase difference using a polarizing plate.

TABLE 1

| | Tension range of stretching (N) | Stretching ratio range (times) |
| --- | --- | --- |
| Example 1 | 1530–2210 | 2.34–5.33 |
| Comparative example 1 | 1780–2140 | 3.42–4.98 |

According to Example 1 of the present invention, compared with Comparative example 1 by prior art, a tension range in which a stable stretching is obtainable is wider, and also an adjustment in wide range is possible, as shown in Table 1. In addition, a minimum value of the stretch tension in Example 1 represents a value at which if a stretch tension becomes smaller than the value an instability of an edge will be generated where the film separates from the heating roll, and a resulting stretch irregularity is given. And, a maximum value is a value at which if it is higher a breakage at the time of stretching produces. A minimum value of the stretch tension in Comparative example 1 is a value at which if a stretch tension becomes smaller than the value an inadequate contact of the film to the heating roll will be generated, and a resulting stretch irregularity based on floating-up is given. And, a maximum value is a value at which if it is higher a breakage at the time of stretching produces.

Example 2

An oriented film was manufactured as in Example 1 except that in Example 1 a peripheral velocity difference of a heating roll and a stretch roll was adjusted so that a tension from a direction ahead at the time of a stretching was set to 1830 N, and a stretching ratio to four times and a stretching was performed, and except that a rate of strain is adjusted as shown (1) and (2) in Table 2.

The degree of orientation was evaluated about the obtained oriented film. A value ($\Delta n$) of a birefringence measured with an automatic birefringence measuring equipment manufactured by Oji Scientific Instruments (KOBRA21ADH) was defined as an index of birefringence.

TABLE 2

|     | Rate of strain (1/s) | Birefringence ($\Delta n$) |
| --- | --- | --- |
| (1) | 1.1 | 0.016 |
| (2) | 4.3 | 0.023 |

In (2) where a rate of strain is no less than 1.4 (1/s), a larger birefringence ($\Delta n$) is acquired compared with (1) where a rate of strain is less than 1.4 (1/s), as shown in Table 2. In addition, it is accepted widely that in order to acquire characteristics of a polarizing plate having good contrast, no less than 0.020 of birefringence ($\Delta n$) are required.

What is claimed is:

1. A manufacturing method for an oriented film, comprising the steps of:
   contacting a non-stretched film, comprising polyvinyl alcohols or derivatives thereof, with moisture percentage adjusted to no more than 10%, to at least one heating roll currently driven and heating the film at no less than 70° C.;
   subsequently giving a tension and stretching using a peripheral velocity difference between the heating roll concerned and a stretch roll in a position ahead of said heating roll in a running direction of the film.

2. The manufacturing method for an oriented film according to claim 1, wherein a rate of strain is set to no less than 1.4 (1/s) in said stretching process.

3. The manufacturing method for an oriented film according to claim 1, wherein the non-stretched film is dyed with iodine or a dicbroism dyestuff before the non-stretched film is stretched.

4. The manufacturing method for an oriented film according to claim 1, wherein the stretched film is dyed with iodine or a dichroism dyestuff after the non-stretched film is stretched.

5. The manufacturing method of claim 2, wherein the rate of strain is set to no less than 2.5 (1/s).

6. The manufacturing method of claim 2, wherein the rate of strain is set to not less than 5.0 (1/s).

7. The manufacturing method of claim 1, wherein the moisture percentage of the non-stretched film is adjusted to no more than 8%.

8. The manufacturing method of claim 1, wherein the moisture percentage of the non-stretched film is adjusted to no more than 5%.

9. The manufacturing method of claim 1, wherein a surface temperature of the heating roll is from about 80° C. to about 120° C.

10. The manufacturing method of claim 1, wherein a surface temperature of the heating roll is from about 90° C. to about 110° C.

11. The manufacturing method of claim 1, wherein the stretch roll is in an un-heated state or in a heated state at less than 70° C.

12. The manufacturing method of claim 1, wherein the stretch roll is in un-heated state.

13. The manufacturing method of claim 1, wherein the stretch roll is in heated state at less than 70° C.

14. The manufacturing method of claim 1, wherein a surface temperature of the heating roll is no less than 70° C.

15. The manufacturing method of claim 1, wherein a surface temperature of the heating roll is no less than 80° C.

16. The manufacturing method of claim 11, wherein a surface temperature of the heating roll is no less than 70° C.

17. The manufacturing method of claim 11, wherein a surface temperature of the heating roll is no less than 80° C.

18. The manufacturing method of claim 11, wherein the stretched film is dyed with iodine or a diebroism dyestuff after the non-stretched film is stretched.

19. The manufacturing method for an oriented film according to claim 18, wherein a rate of strain is set to no less than 1.4 (1/s) in said stretching process.

* * * * *